United States Patent [19]
Aurilio et al.

[11] Patent Number: 5,895,010
[45] Date of Patent: Apr. 20, 1999

[54] RADIOSONDE BALLOON LAUNCHING SYSTEM

[75] Inventors: Giuseppe Aurilio, Arlington, Mass.; James M. Berrigan, Merrimack, N.H.; Albert G. Hurd, Bedford, Mass.

[73] Assignee: Visidyne, Inc., Burlington, Mass.

[21] Appl. No.: 09/127,192

[22] Filed: Jul. 31, 1998

Related U.S. Application Data

[62] Division of application No. 08/700,238, Aug. 20, 1996.

[51] Int. Cl.$^6$ .................................................. B64B 1/40
[52] U.S. Cl. ........................... 244/1 TD; 244/31; 244/63; 244/98
[58] Field of Search ................. 244/1 TD, 31, 244/33, 63, 96, 98; 116/DIG. 9; 141/313, 314, 317; 446/220, 225

[56] References Cited

U.S. PATENT DOCUMENTS

| | | | |
|---|---|---|---|
| 4,494,714 | 1/1985 | Hill et al. | 244/31 X |
| 4,564,159 | 1/1986 | Hill et al. | 244/31 X |
| 4,795,112 | 1/1989 | Hashimoto | 244/33 |
| 4,911,379 | 3/1990 | Kopelman | 244/31 |
| 5,548,283 | 8/1996 | Martin | 244/1 TD X |
| 5,636,480 | 6/1997 | Lauritsen et al. | 244/33 X |

*Primary Examiner*—William Grant
*Attorney, Agent, or Firm*—Iandiorio & Teska; Brian J. Colandreo

[57] ABSTRACT

A radiosonde balloon launching system including a silo for housing an array of radiosonde balloon modules and for sheltering radiosonde balloons during inflation, a base for containing radiosonde balloon inflation and launch apparatus and a device for shielding the silo until the radiosonde balloons are ready to be launched.

19 Claims, 14 Drawing Sheets

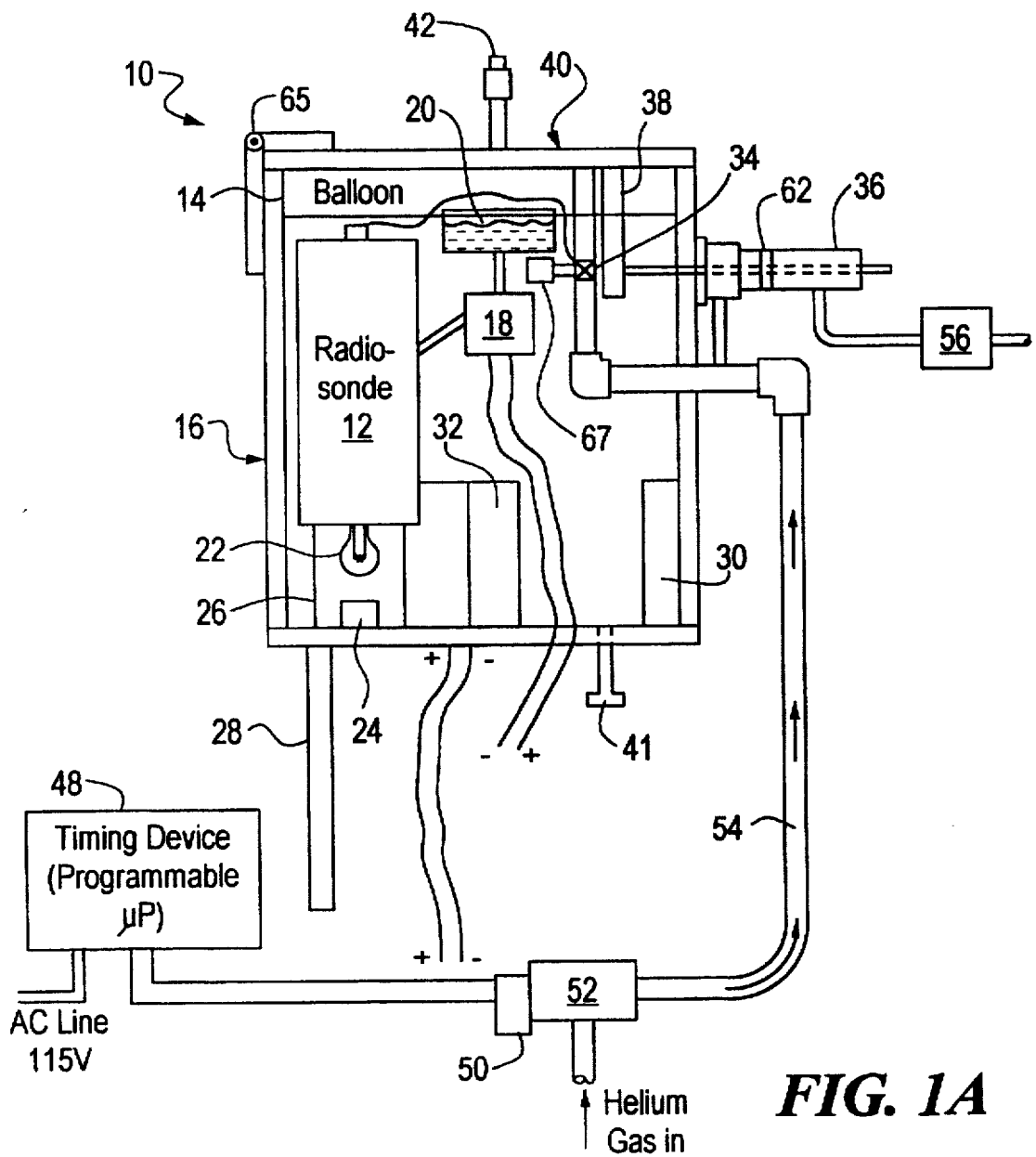
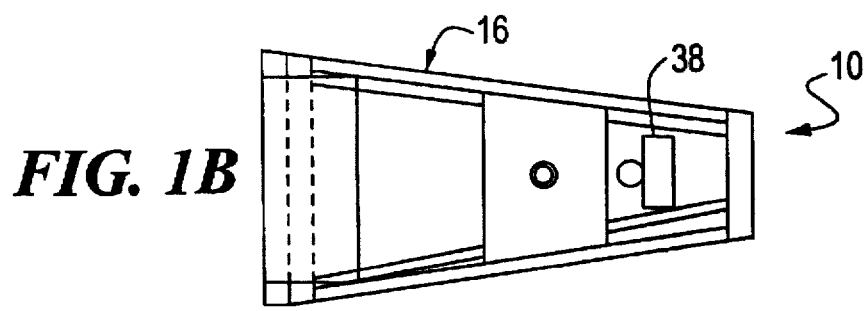

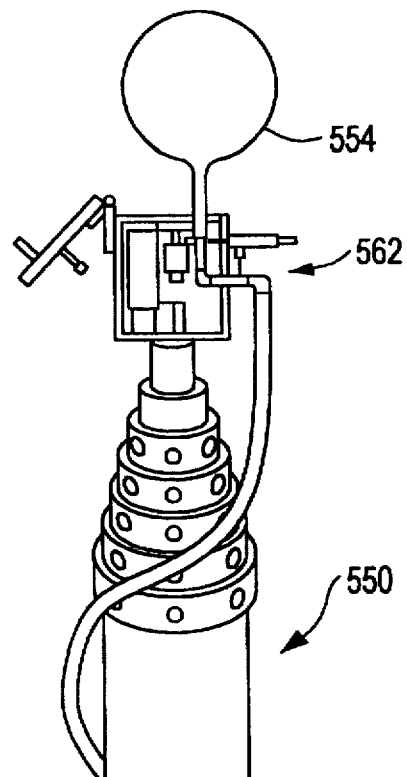
*FIG. 14*
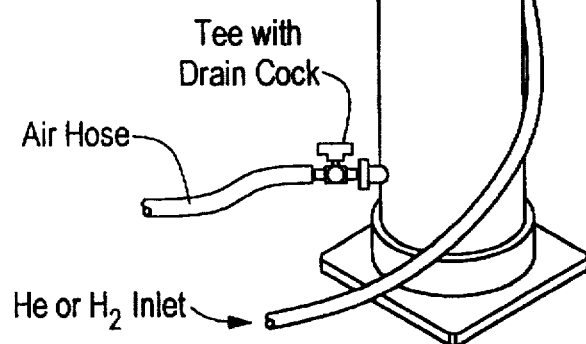

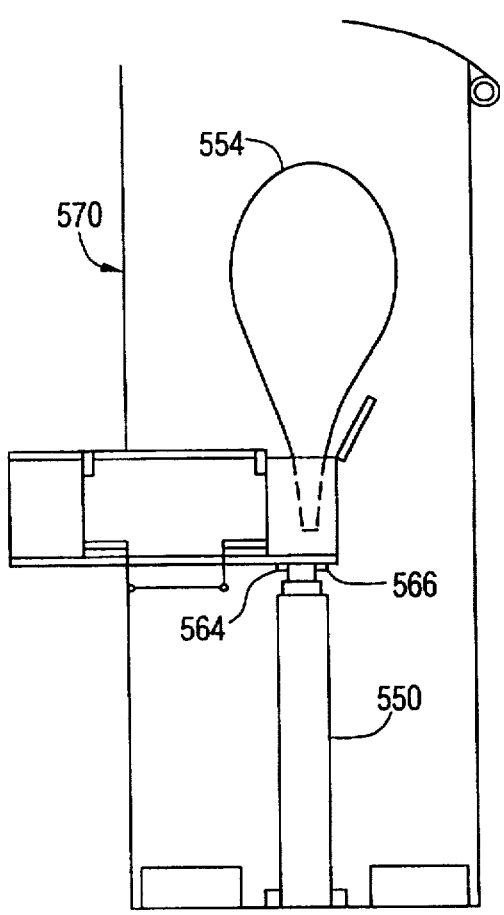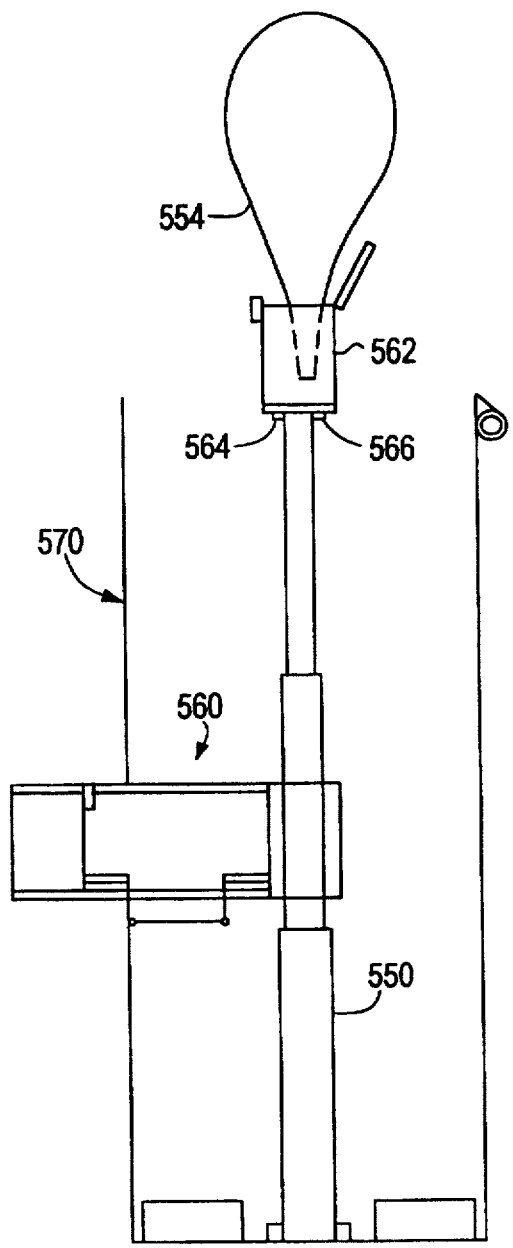
*FIG. 15B*  *FIG. 15C*

5,895,010

RADIOSONDE BALLOON LAUNCHING SYSTEM

This is a division, of application Ser. No. 08/700,238, filed Aug. 20, 1996.

FIELD OF INVENTION

This invention relates to radiosonde balloon launching and more particularly to a self-contained automatic radiosonde balloon launching system.

BACKGROUND OF INVENTION

Radiosondes are small radio transmitters which are tethered to helium or hydrogen filled balloons and launched into the upper atmosphere to collect atmospheric data and to transmit this data to a remote data collection location. Radiosondes are used to measure temperature, air pressure, wind speed, ozone levels and humidity. The National Weather Service, in conjunction with weather services all over the world, simultaneously launches radiosondes in order to form a measurement grid of the upper atmosphere. These launches typically occur twice daily at twelve-hour intervals.

Launching each radiosonde typically requires two people and can take up to two hours to complete. First, the balloon is manually inflated. The balloons can be either three-foot diameter, 300-gram balloons or six-foot diameter 600-gram and 1200 gram balloons, depending on the weather conditions and the size of the radiosonde being launched. The balloons are formed of very thin latex and must be inflated very slowly in order to minimize the risk of rupturing. The inflation takes approximately ten to fifteen minutes at which time the buoyancy of the balloon is manually measured by the technician. Generally, a three-foot balloon must have approximately 300 grams of lift capacity and a six-foot balloon must have approximately 1 kg of lift capacity. Once the balloon is inflated, it is sealed and the radiosonde is tied to the balloon with approximately 60-100 feet of line.

Preparing the radiosonde for launching involves unpacking the radiosonde and correctly positioning the hygrometer, pressure sensor, transmitter and antenna from the sonde to ensure proper operation of each measurement element. The sonde includes a battery which is sealed and dry during shipping and must be soaked in water in order to charge the battery. Once soaked, the battery requires several minutes to charge. A technician then checks the battery voltage using a light bulb, turns the transmitter on and registers the ID code of the sonde by scanning the bar code which identifies each sonde during its flight. The technician then checks the function of each of the measuring elements, e.g., the thermometer, hygrometer, pressure sensor, to ensure that each is functioning properly.

This process is time consuming, requires a team of technicians and can be hazardous and difficult to perform in remote launch sites such as on mountain ranges and in deserts.

SUMMARY OF INVENTION

It is therefore an object of this invention to provide an improved radiosonde balloon launching system.

It is a further object of this invention to provide an automatic radiosonde balloon launching system which is completely self-contained and eliminates the need for technician involvement in the launching procedure.

It is a further object of this invention to provide an automatic radiosonde balloon launching system which allows for safe and accurately timed launching in geographically remote areas.

It is a further object of this invention to provide an automatic radiosonde balloon launching system which facilitates radiosonde balloon launchings in extreme weather conditions.

It is a further object of the invention to provide a radiosonde balloon launching system which monitors on-site wind speed and direction and provides optimum launch conditions for the radiosonde balloon.

It is a further object of the invention to provide a radiosonde balloon launching system which is capable of continuously launching radiosonde balloons.

It is a further object of the invention to provide a radiosonde balloon launching system which, upon detecting a faulty radiosonde balloon or radiosonde, will abort the launch of that radiosonde and call for an attendant to launch another radiosonde.

The invention results from the realization that a radiosonde balloon can be launched from a remote location in extreme weather conditions in a safe, efficient and timely manner by providing a launching system which houses a plurality of radiosonde balloons and radiosondes, automatically inflates the radiosonde balloons within a weather-shielded silo and launches the radiosonde balloons at predetermined time intervals all automatically without the necessity of human intervention.

This invention features a radiosonde balloon launching system including a silo for housing an array of radiosonde balloon modules and for sheltering radiosonde balloons during inflation, base means for containing radiosonde balloon inflation and launch apparatus and means for shielding the silo until the radiosonde balloons are ready to be launched.

In a preferred embodiment, the radiosonde balloon modules may include a radiosonde balloon and- a radiosonde. The radiosonde balloon inflation and launch apparatus may include a microprocessor for executing the inflation and launch of the radiosonde balloons. The radiosonde balloon inflation and launch apparatus may include means for storing a lighter-than-air gas, such as helium or hydrogen. The silo may include means for indicating that the radiosonde balloons are inflated properly, such as a light source and a photoelectric element mounted on opposite interior sides of the silo. The means for shielding may include at least one door hingedly attached to the silo. The means for shielding may include a retractable door, means for rotating the means for ts shielding and a wind direction monitor for supplying wind direction signals to the means for rotating. The means for rotating may include at least one drive mechanism housing a motor for driving at least one driving wheel which contacts and rotates the means for shielding. The base means may include means for deflecting ground wind up into the silo in order to provide additional lift to the radiosonde balloons. The deflecting means may be conical, pyramidical or flat in shape. The radiosonde balloon inflation and launch apparatus may be coupled to each of the radiosonde balloon modules.

Each module may include means for housing one of the radiosonde balloons having a battery-powered radiosonde tethered thereto and means for attaching the radiosonde balloon to the inflation and launch apparatus. Each module may further include means for filling the battery with a battery charging fluid, means for indicating that the battery is fully charged, means for regulating the temperature within the module and means for introducing a purge gas, such as nitrogen, into the module to prevent the radiosonde balloon from deteriorating.

Each module may further include means for monitoring the rate of inflation of the radiosonde balloons the means for attaching may include a balloon release valve which simultaneously stops the flow of helium into the balloon and releases the balloon when engaged. Each module may further include hatch means having a spring-loaded hinge and a latch and a hatch release mechanism; and a balloon release mechanism which engages the balloon release valve, thereby releasing the balloon. The means for indicating may include a light source powered by the battery and a photoelectric element which, in response to detecting the light, outputs a signals which indicates that the battery is fully charged.

The invention also features a system for launching radiosonde balloons comprising a silo for housing an array of radiosonde balloon modules and for shielding the radiosonde balloons during inflation, base means for containing inflation and launch apparatus and means for shielding the silo until the radiosonde balloons are ready to be launched, wherein each module includes means for housing one of the radiosonde balloons having a battery-powered radiosonde tethered thereto and means for attaching each the radiosonde balloon to the inflation and launch apparatus. The radiosonde balloon inflation and launch apparatus may include means for controlling the inflation and launch of the radiosonde balloons and means for storing a lighter-than-air gas, such as helium or hydrogen. The silo may include means for indicating that the radiosonde balloons are properly inflated. The means for indicating may include a light source and a photoelectric element mounted on opposite interior sides of the silo, wherein, upon the detection of light from the light source by the photoelectric element during the inflation of a radiosonde balloon, the photoelectric element outputs a signal indicative of an improperly inflated radiosonde balloon. The means for shielding may include at least one door hingedly attached to the silo. The means for shielding may include a retractable door.

The system may further include means for rotating the means for shielding and a wind direction monitor for supplying wind direction signals to the means for rotating. The means for rotating may include at least one drive mechanism housing a motor for driving at least one driving wheel which contacts and rotates the means for shielding. The base means may include means for deflecting ground wind up into the silo in order to provide additional lift to the radiosonde balloons. The deflecting means may be conical, pyramidical or flat in shape. The radiosonde balloon inflation and launch apparatus may be coupled to each of the radiosonde balloon modules.

DISCLOSURE OF PREFERRED EMBODIMENT

Other objects, features and advantages will occur to those skilled in the art from the following description of a preferred embodiment and the accompanying drawings, in which:

FIGS. 1A and 1B are schematic diagrams of a side view and top view, respectively, of the radiosonde balloon launching module of the present invention;

FIG. 14 is a three-dimensional diagrammatic view of a telescopic pole adapted for use in the system of this invention;

FIG. 15B is a schematic side elevational view of the module loading mechanism of FIG. 15A with the pole retracted; and FIG. 15C is a schematic side elevational view of the module loading mechanism of FIG. 15A with the pole extended.

Figure 2A:
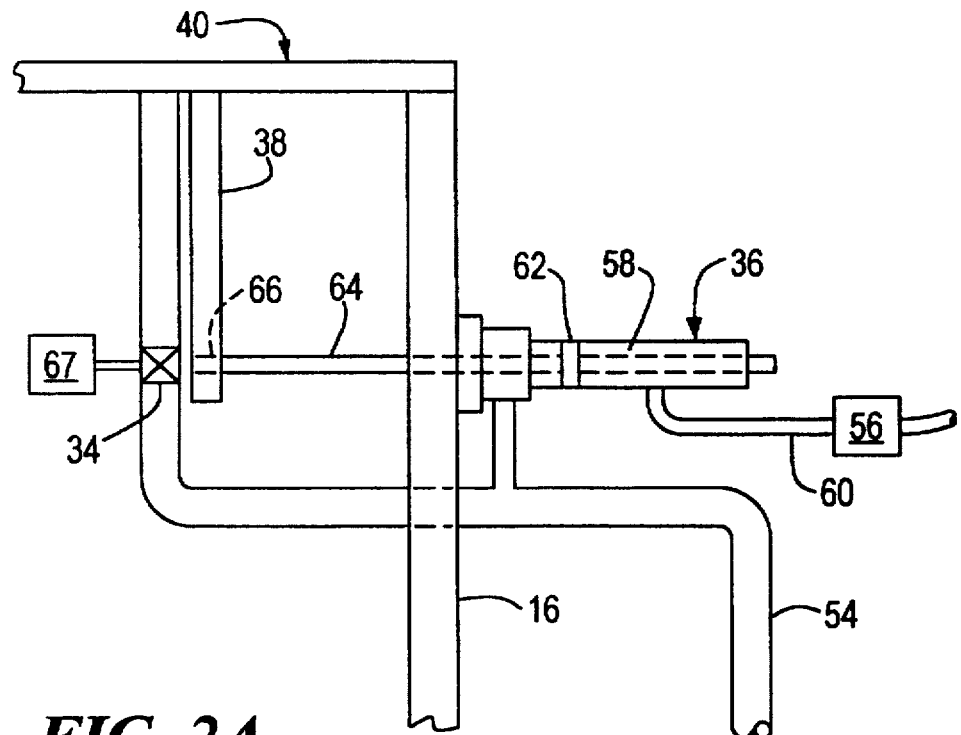
FIGS. 2A and 2B are schematic diagrams showing the operation of the balloon release valve and hatch cover/balloon release mechanism of the module of FIG. 1.

In FIGS. 1A and 1B there is shown a side view and top view, respectively, of radiosonde balloon launching module 10 of the present invention. In FIG. 1A, radiosonde 12 and balloon 14 are stored within hermetically sealed radiosonde balloon launching module 16. Battery-water control valve 18 operates to inject water from battery water supply 20 into the cells of the battery of radiosonde 12 when launch preparation begins. Radiosonde 12 includes light bulb 22 connected to its battery. When the battery is fully charged, bulb 22 receives power from the battery and illuminates, causing photoelectric element 24 to sense the illumination and thus confirm that the battery is fully charged. Radiosonde 12 also includes antenna 26 for transmitting collected data back to a weather station. Radiosonde balloon launching module 16 includes antenna tube 28 for housing antenna 26 before launch, an electric heater and thermostat 30 and fan 32 for providing temperature regulation inside module 16. This is especially important when the module is used in cold weather climates to prevent water supply 20 from freezing. Module 16 also includes balloon release valve 34 over which the neck of balloon 14 is fastened and hatch cover/balloon release mechanism 36 which extends through latch 38 which locks hatch cover 40 closed. Module 16 is initially injected with nitrogen through nitrogen port 41 in order to purge oxygen, which can degrade the balloon, in the module. Purge vent valve 42 allows the purged air to escape.

Microprocessor 48 controls the timing of all operations within the module 16 to including helium or hydrogen gas valve control 50 which opens gas valve 52 allowing gas to flow through pipe 54 to balloon release valve 34. Balloon release valve 34 and hatch cover/balloon release mechanism 36 are described in greater detail below with reference to FIGS. 2A and 2B.

Figure 2B:
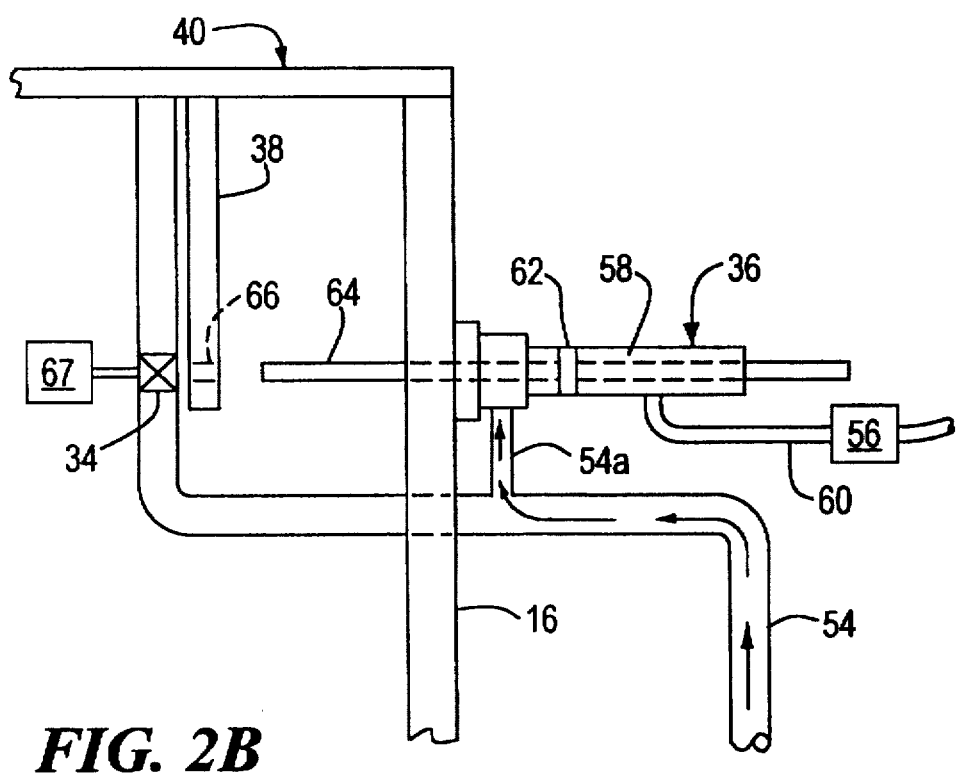

In FIG. 2A there is shown a close-up view of the balloon release valve 34 and 15 hatch cover/balloon release mechanism 36. Module 16 is initially set up such that rod 64 of hatch cover/balloon release mechanism 36 is inserted through hole 66 without contacting balloon release valve 34. When the launch sequence is initiated, FIG. 2B, hydrogen or helium flows through pipe 54, to pipe 54a into air cylinder 58, driving plunger 62 from cover latch 38 and rod 64 out of hole 66 to release hatch cover latch 38. This allows balloon 14 to inflate once hatch cover 40, aided by spring-loaded hinge 65, FIG. 1A, opens, allowing balloon 14 to inflate to its full size.

Figure 3:
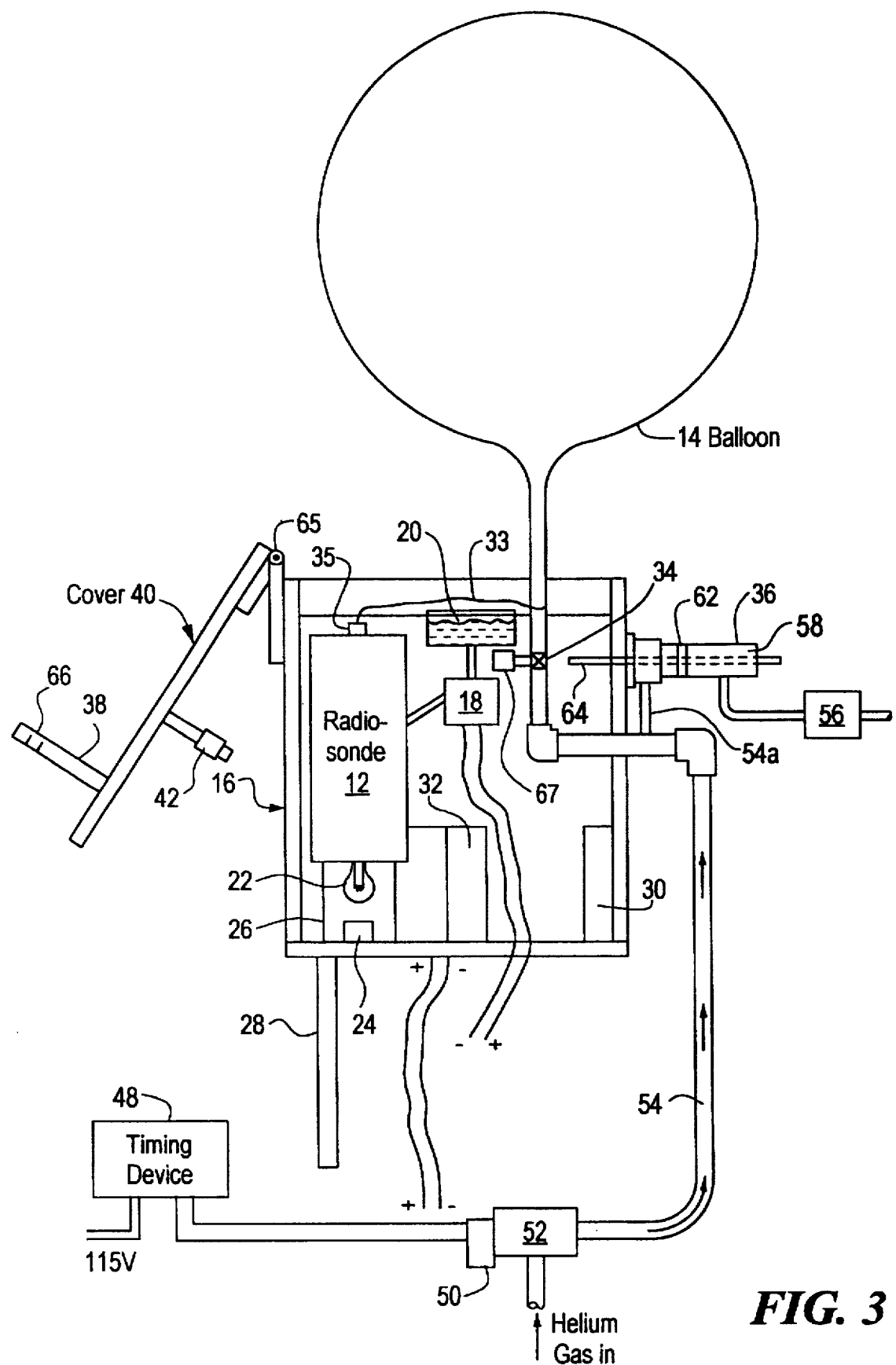
FIG. 3 is a schematic diagram showing the module of the present invention during the inflation of the radiosonde balloon.

FIG. 3 shows module 16 during the inflation of balloon 14. The flow of hydrogen or helium into the balloon is monitored by flowmeter 67 which indicates to microprocessor 48 when balloon 14 is adequately inflated, causing microprocessor 48 to instruct gas valve control 50 to close gas valve 52 and to open compressor valve 56. Compressed air is then supplied to air cylinder 58, causing plunger 62 to drive rod 64 against release valve 34, releasing balloon 14. Balloon 14 then begins its ascent, causing tether 33 to unravel from spool 35 which is attached to the top of radiosonde 12. While the tether 33 is unraveling, radiosonde 12 is lifted out of module 16 and ascends along with balloon 14 into the atmosphere while collecting data and transmitting the data via antenna 26 to a ground based weather station.

Figure 4:
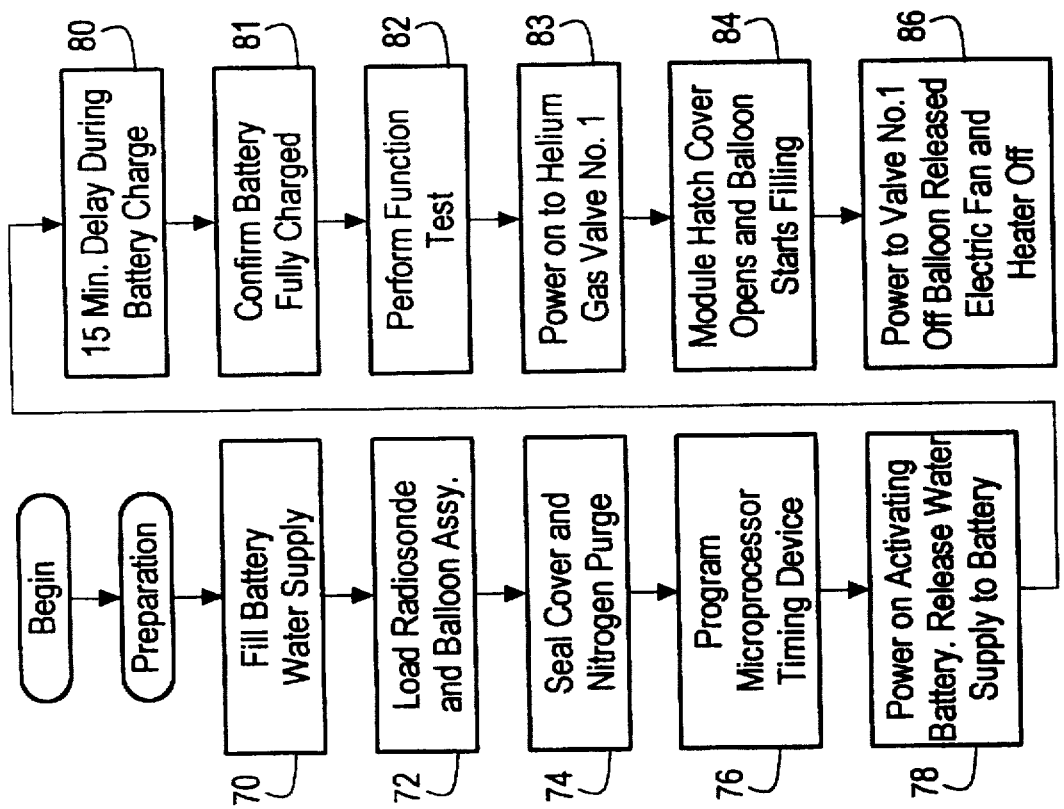
FIG. 4 is a flow chart showing the radiosonde balloon launch procedure.

FIG. 4 shows a flow chart of the procedure involved in the launching of balloon 14 and radiosonde 12. In step 70, the battery water supply is filled. In step 72, radiosonde 12 and balloon 14 are loaded into module 16 which is then sealed and purged with nitrogen, step 74. In step 76, microprocessor 48 is programmed to initiate the launch at a predetermined time, and in step 78, battery release water supply 18 is activated to inject water into the battery of radiosonde 12. After a fifteen-minute delay during which the battery is charging, step 80, light 22 illuminates, causing photoelectric element 24 to confirm that the battery is fully charged, step 81. In step 82, the radiosonde performs a functional self-test and any irregularities in the operation of radiosonde 12 or its battery are transmitted to the weather station. Power is supplied to gas valve control 50, step 83, module hatch cover 40 is opened and balloon 14 is inflated with hydrogen or helium through gas valve 52, step 84. In step 86, once flowmeter 67 determines that balloon 14 is adequately inflated, hydrogen or helium gas valve control 50 is deactivated and compressor valve 56 is activated to supply compressed air to cylinder 58 causing rod 64 to engage balloon release valve 34 thereby releasing balloon 14. Electric fan 32 and heater 30 are then turned off as they are no longer necessary.

Figure 5:
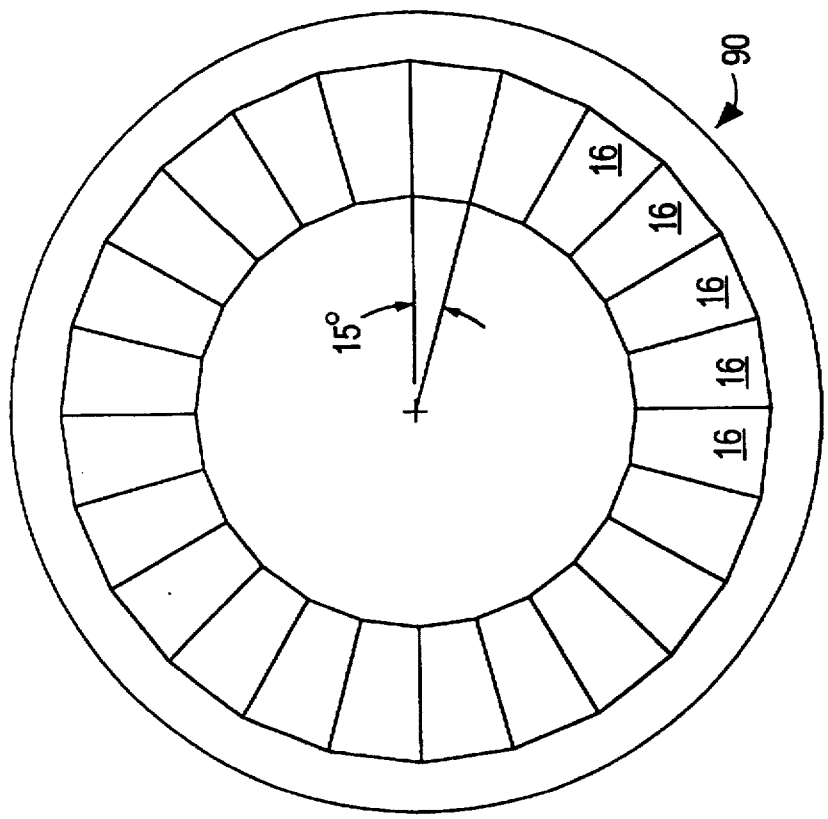
FIG. 5 is a schematic diagram of a circular array of modules of the present invention.
Figure 6:
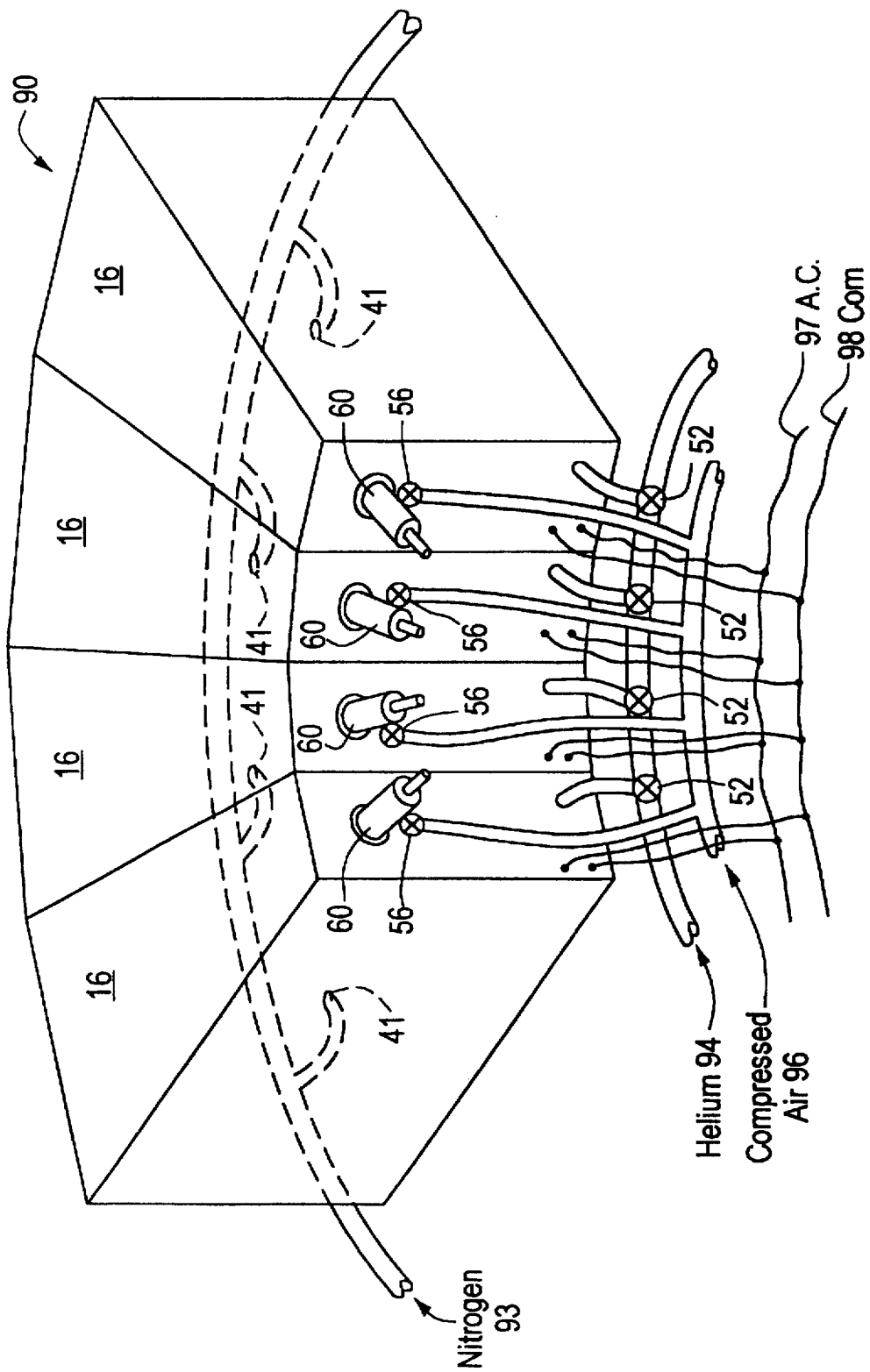
FIG. 6 is a schematic diagram showing the common connections of each of the modules of the circular array of FIG. 5.

In a preferred embodiment, a plurality of modules 16 are arranged in a circular array such as that shown in FIG. 5. FIG. 6 shows how the modules 16 of circular array 90 are connected to the hydrogen or helium tanks, nitrogen tanks, air compressor, A.C. power and the microprocessor 48. Nitrogen is supplied to each module's nitrogen port 41 through line 93, hydrogen or helium is supplied to each module's gas valve 52 through line 94 and compressed air is supplied to each module's compressor valve 56 through line 96. Power is supplied to each module via A.C. line 97 and communications with microprocessor 48 are carried out over line 98.

Figure 7:
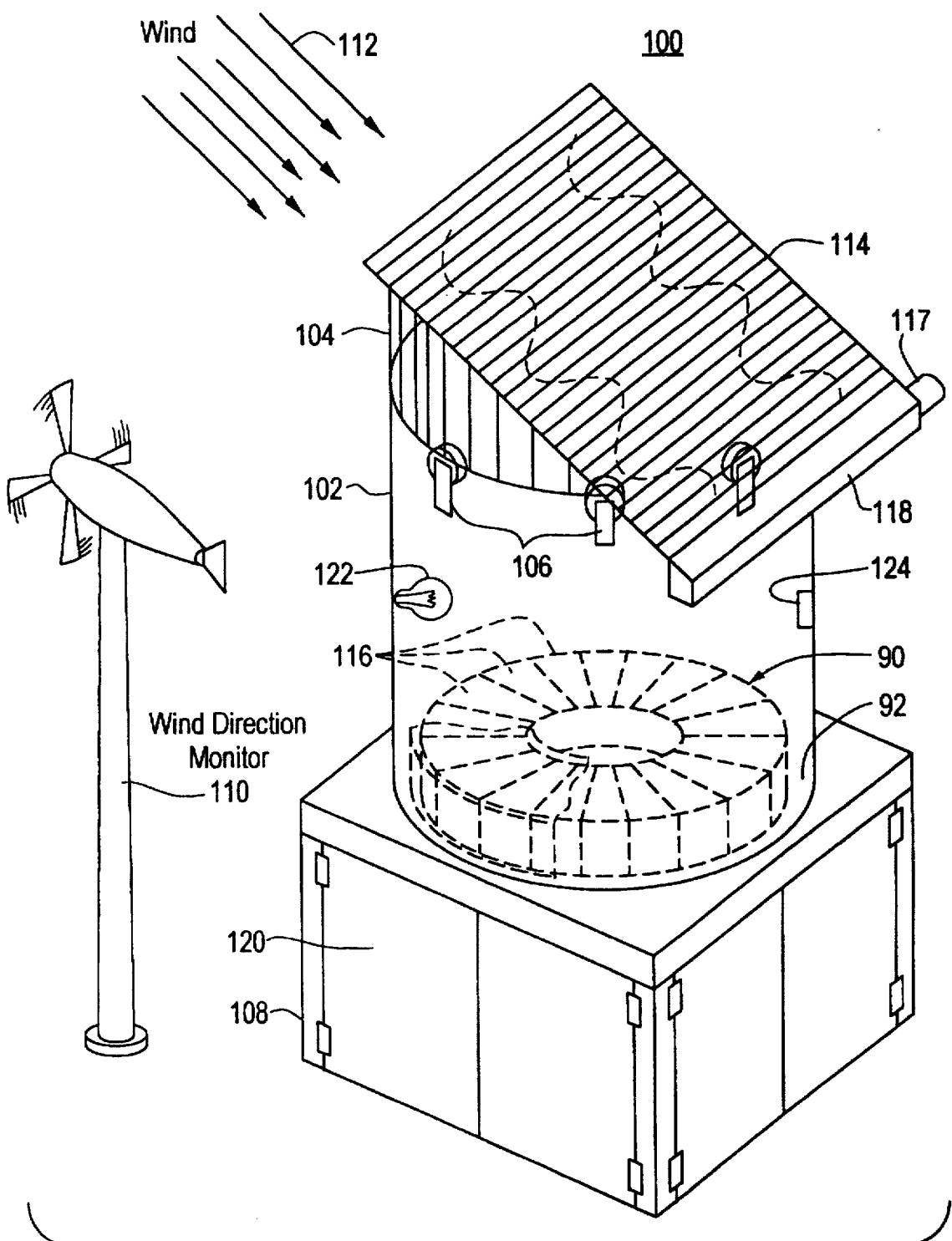
FIG. 7 is a schematic diagram of an automatic module launching system of the present invention.

Circular array 90 is loaded into radiosonde module launching system 100 as shown in FIG. 7. Launching system 100 includes fixed cylindrical silo 102, which is approximately 72 inches in diameter and 72 inches in height, for protecting the balloon from adverse weather conditions as it is inflating. Base 108, approximately six feet in height, width and depth, houses microprocessor 48, helium tanks, nitrogen tanks, an air compressor and power supplies necessary for the radiosonde balloon launching process.

Rotatable section 104 is wedge-shaped and includes retractable silo cover 114. In response to wind direction signals from wind direction monitor 110, section 104 rotates to position the highest side of section 104 toward the direction of the wind as shown by arrows 112. This provides greater protection for balloon 14 against the wind when it is launched. Section 104 rotates by means of a plurality of drive mechanisms 106 which are mounted at the top of silo 102. Drive mechanism 106 is described in greater detail below with reference to FIG. 8.

Retractable silo cover 114 includes drive 117 which retracts cover 114 into housing 118 when balloon 14 is ready to be launched. Base 108 is designed such that a technician can enter the base through service door 120 to service launching system 100 including replacing modules 16 of circular array 90, refilling the hydrogen or helium and nitrogen tanks, etc. Access to modules 16 is provided through the center of circular array 90 which is approximately 39 inches in diameter. Silo 102 also includes light source 122 and photoelectric element 124. These are used to ensure that balloon 14 has properly inflated prior to the launch. When balloon 14 is properly inflated, the balloon will block light source 122 from photoelectric element 124. If balloon 14 bursts during inflation or is otherwise improperly inflated or defective, photoelectric element 124 detects light source 122 and outputs a signal to the weather station indicating that balloon 14 is not properly inflated. The launch of that particular radiosonde balloon can be aborted and the launch preparation sequence is initiated with an adjacent module. Silo cover 114 may also include an ice control heater to reduce the possibility of silo cover 114 freezing and being unable to be retracted when the launching system is used in cold climates.

Figure 8:
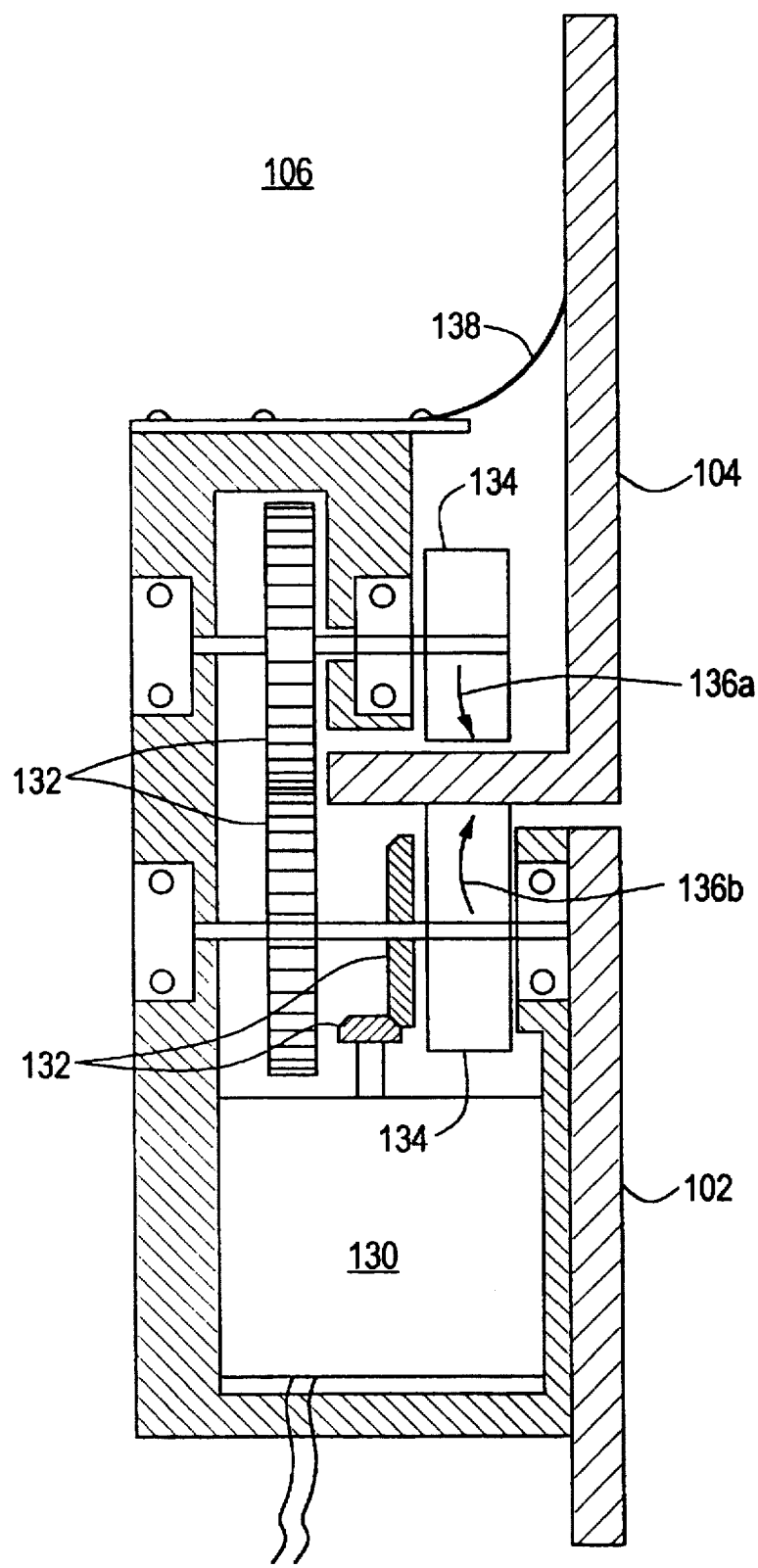
FIG. 8 is a schematic diagram of the rotatable section drive mechanism of the present invention.

Drive mechanism 106 is shown in greater detail in FIG. 8. Drive mechanism 106 is attached to silo 102 and includes motor gear box 130 which drives gears 132 which in turn rotate rubber wheels 134 in the direction of arrows 136a and 136b to drive rotatable section 104 to the desired position. Two rubber wheels are used to ensure that, regardless of wind conditions, at least one wheel is contacting rotatable section 104 at all times. Drive mechanism 106 also includes flexible shield 138 which blocks any snow or other debris from entering into the drive mechanism.

Figure 9:
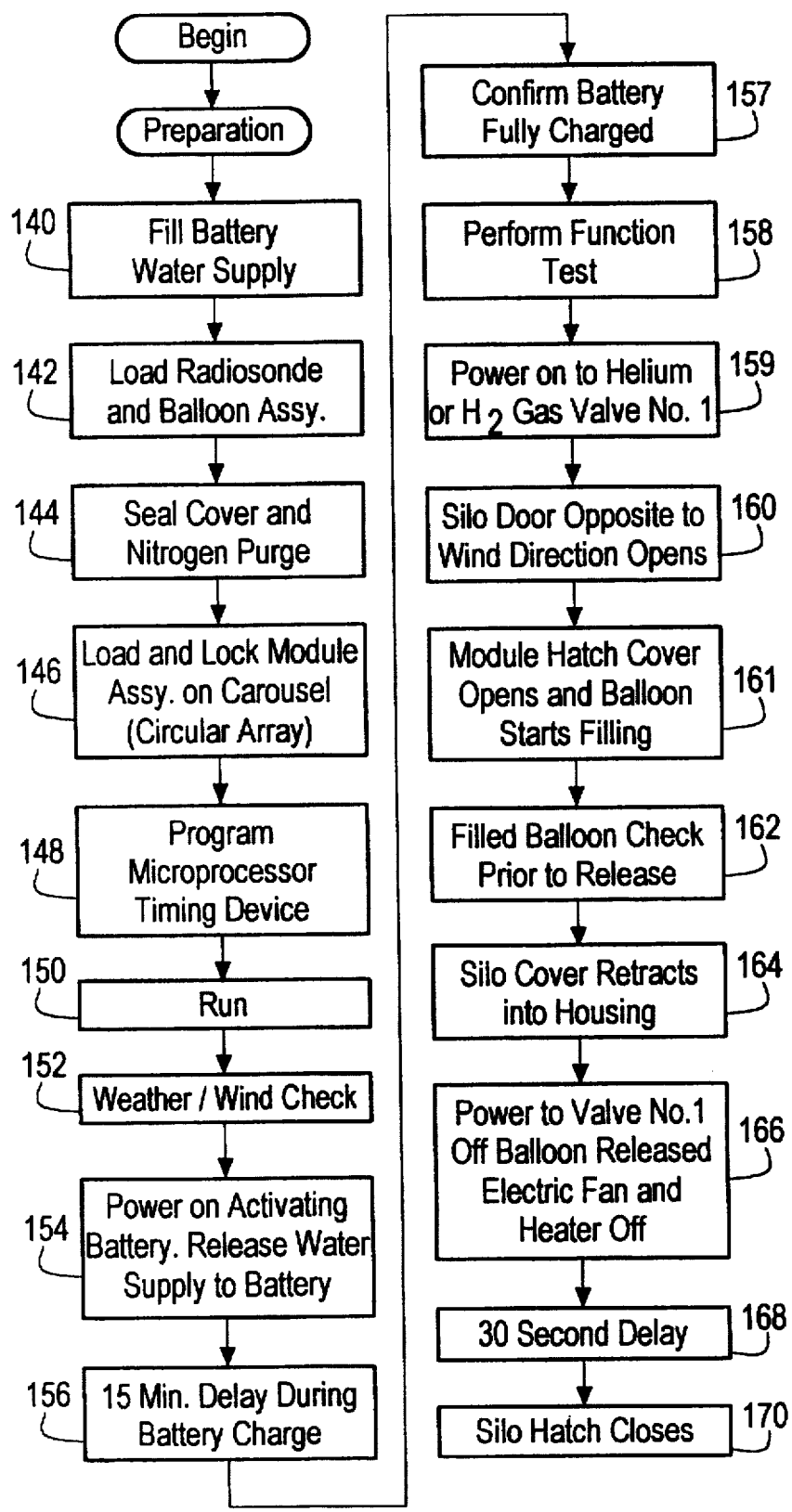
FIG. 9 is a flow chart showing a more detailed launch procedure of the automatic radiosonde balloon launching system of the present invention.

The operation of launching system 100 is shown in the flow chart of FIG. 9. Preparation begins in step 140 by filling the battery water supply in each of the modules 16. The radiosonde and balloon assemblies are loaded into each module, step 142. The modules are sealed and nitrogen purged, step 144, assigned an ID code and loaded into circular array 90 and attached as shown in FIG. 5 within silo 102, FIG. 7, step 146. Microprocessor 48 is then programmed, step 148, and run, step 150. Wind speed and direction are determined by wind direction monitor 110, FIG. 7, in step 152 and rotatable section 104 is positioned accordingly. In step 154, battery water control valve 18 is activated, supplying water from battery water supply 20 to the battery within radiosonde 12. After a fifteen-minute delay during which the battery is charging, step 156, light 22, FIG. 1, illuminates causing photoelectric element 24, FIG. 1A, to confirm that the battery is fully charged, step 157. In step 158, the radiosonde performs a functional self-test. Any irregularities in the operation of radiosonde 12 or its battery are transmitted to the control station. If there are any problems with radiosonde 12, the control station personnel can abort the launch of this particular module and continue the launch process with the next module in circular array 90. After this test, hydrogen or helium gas valve control 50, FIG. 1A, is powered on, step 158, module hatch cover 40 opens and balloon 14 begins to inflate, step 160. In step 162, balloon 14 is checked using light source 122 and photoelectric element 124 to ensure that it is properly inflated and the silo cover 114 retracts into housing 118, step 164. In step 166, the balloon is released by balloon release mechanism 36 and after a thirty-second delay, step 168, silo cover 114 closes, step 170. This process is repeated for each radiosonde balloon launching which is programmed into microprocessor 48.

Figure 10:
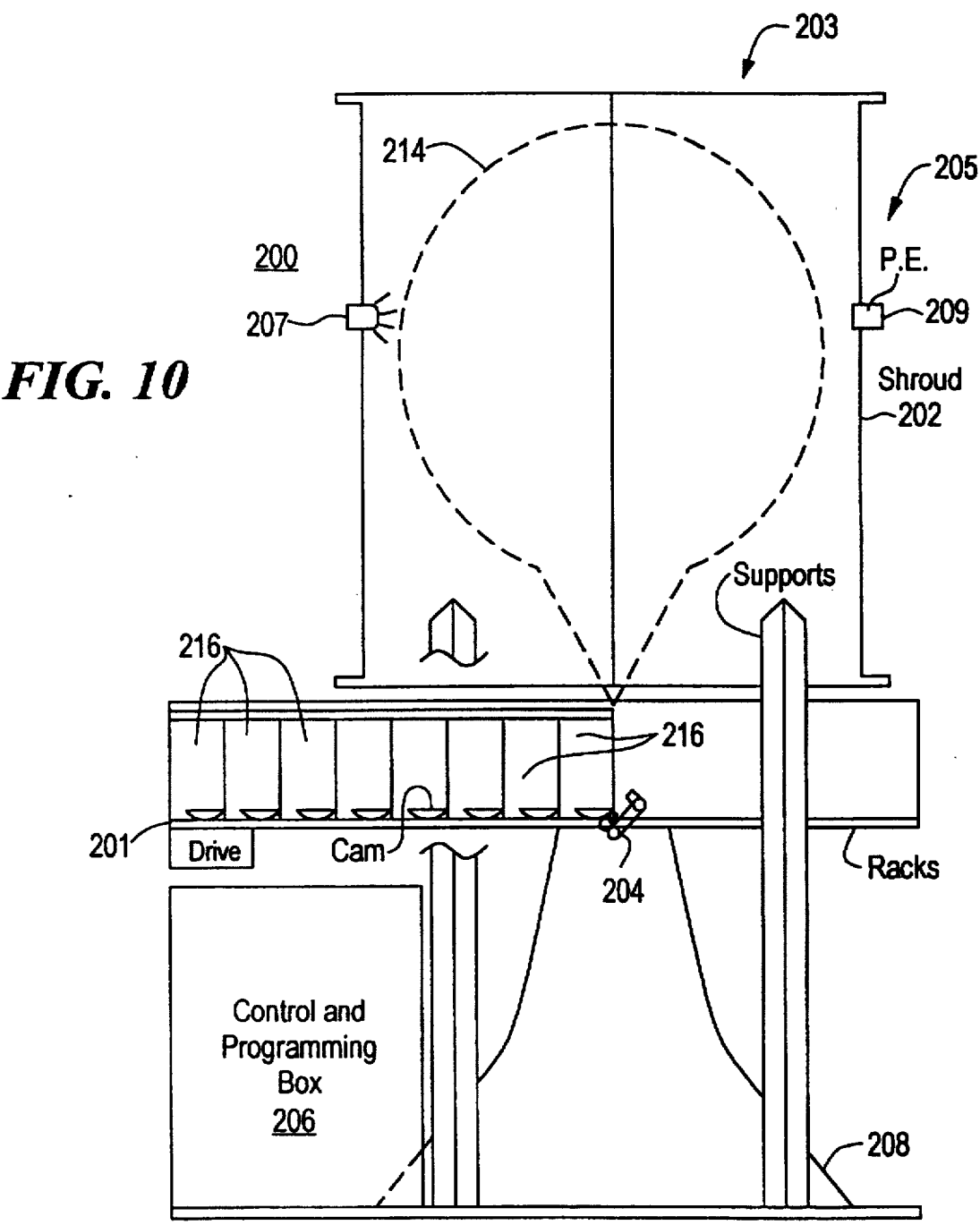
FIG. 10 is a schematic diagram of an automatic radiosonde balloon launching system which utilizes a linear array of modules according to the present invention.
Figure 11:
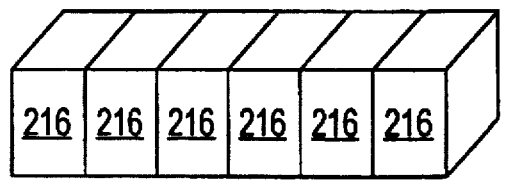
FIG. 11 is a schematic diagram of the linear array of modules used in accordance with the embodiment of FIG. 10.

A second embodiment of the present invention is shown in FIG. 10. In this embodiment, modules 216 are arranged in a linear array as shown in FIG. 11, and are loaded on track 201 of radiosonde launching system 200. Each module 216 is shifted toward balloon filling and release mechanism 204 to begin each launch procedure. Control and programming box 206 houses microprocessor 48, compressor 56, FIG. 1A, as well as the hydrogen or helium, nitrogen and compressed air tanks and power supply necessary for the launch. Radiosonde launching system 200 also includes wind deflector 208 which is conical in shape and directs wind up into silo 202 to provide additional lift to balloon 214 when it is launched. Silo 203 also includes a device 205 for indicating that radiosonde balloon 214 is properly inflated prior to the launch. Indicating device 205 includes a light source 207 and a photoelectric element 209. When balloon 214 is properly inflated, the balloon will block light source 207 from photoelectric element 209. If balloon 214 bursts during inflation or is otherwise improperly inflated or defective, photoelectric element 209 detects light source 207 and outputs a signal to the weather station indicating that balloon 214 is not properly inflated. The launch of that particular radiosonde balloon 214 can be aborted and the launch preparation sequence initiated with an adjacent module.

Figure 12B:
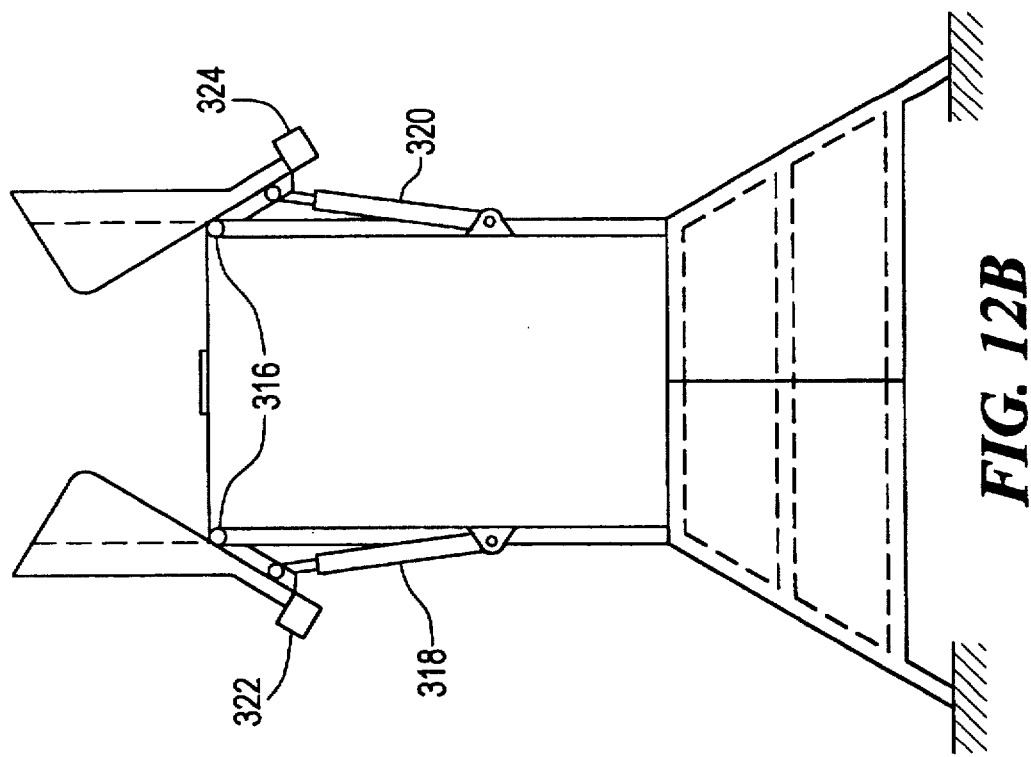
FIGS. 12A and 12B are schematic side elevational diagrams of an automatic radiosonde balloon launching system with the hinged cylindrical silo covers closed and opened, respectively.
Figure 12A:
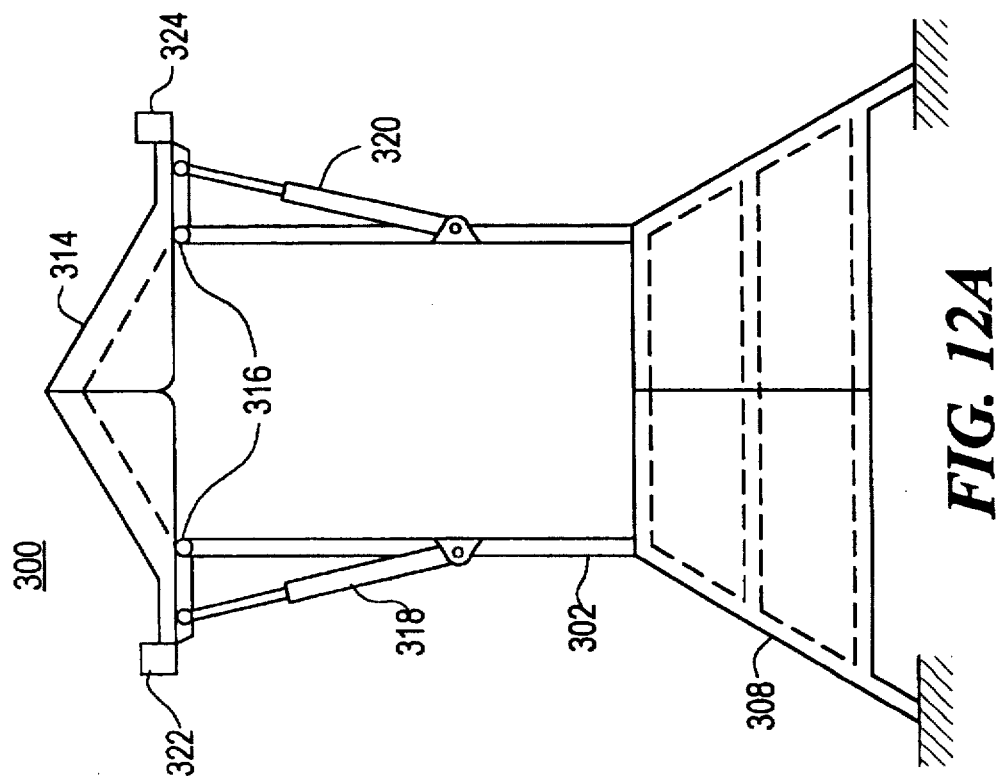

Another embodiment of the present invention is shown in FIGS. 12A and 12B. In launching system 300, FIG. 12A, which includes cylindrical silo 302 and base 308, silo cover 314 consists of a pair of doors attached to silo 302 at hinges 316. When a radiosonde balloon is ready to be launched, FIG. 12B, pistons 318 and 320 pull counterweights 322 and 324 down, causing cover 314 to open allowing the balloon to ascend.

Figure 13:
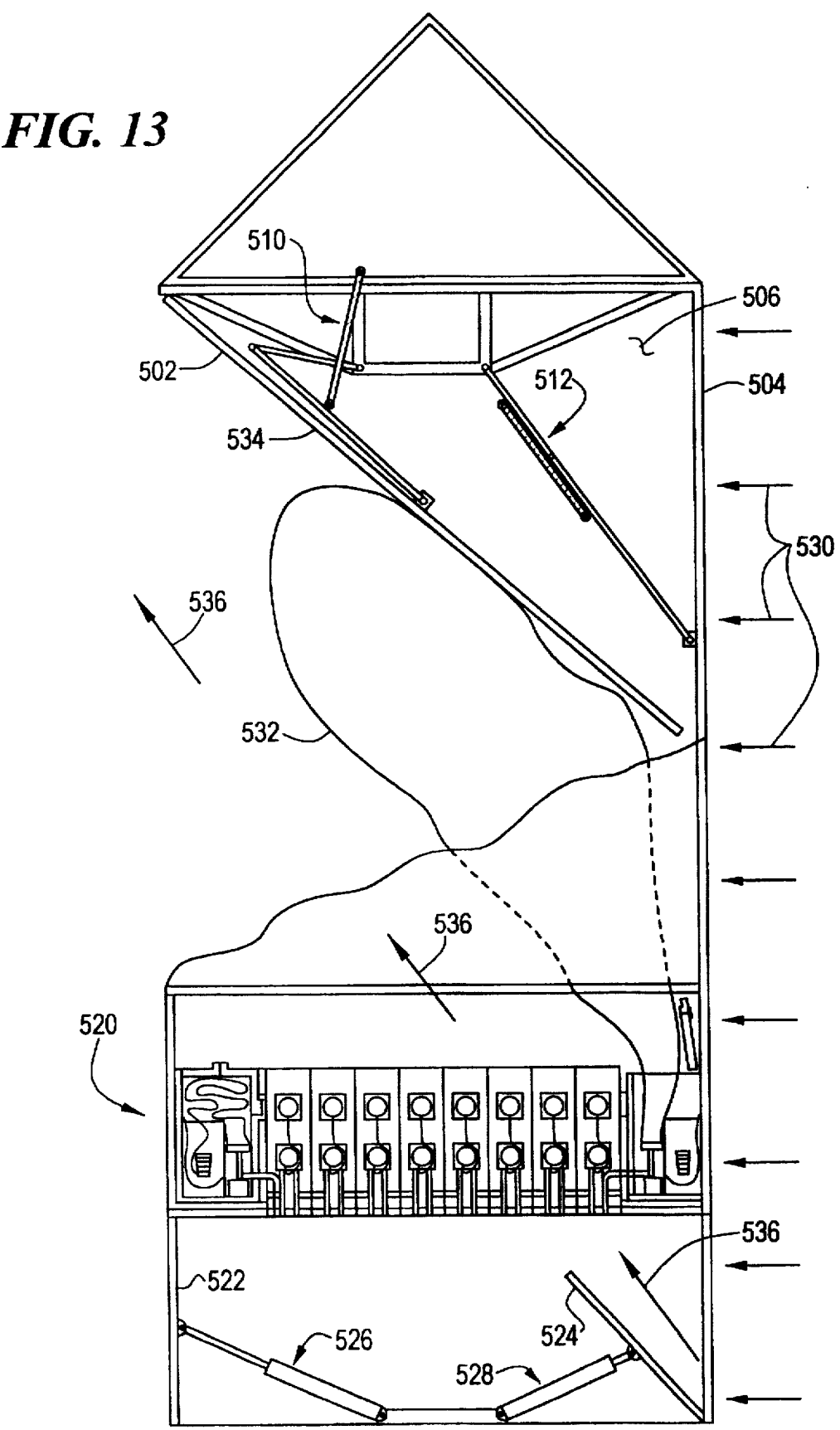
FIG. 13 is a schematic, side elevational view of an alternative silo construction.

An alternative silo 500, FIG. 13, has a plurality of panels or launch doors, four in this example, 502, 504, 506, 508, each one operable to open inwardly by an associated pneumatic actuator only two of which, 510, 512, are shown. The base 520 of silo 500 includes a like number of draft doors only two of which are shown, 522, 524, operable by pneumatic actuators 526, 528. When the wind is sensed coming from the direction of arrow 530, launch door 502 opposite the wind direction (leeward side) is opened inwardly. Bottom 532 is then inflated and slides up the surface 534 of door 502 toward launch. Surface 534 may be a low friction material such as Teflon. The draft door 524 to windward is opened to create an updraft 536 in silo 500 to assist launching of balloon 532.

Figure 15A:
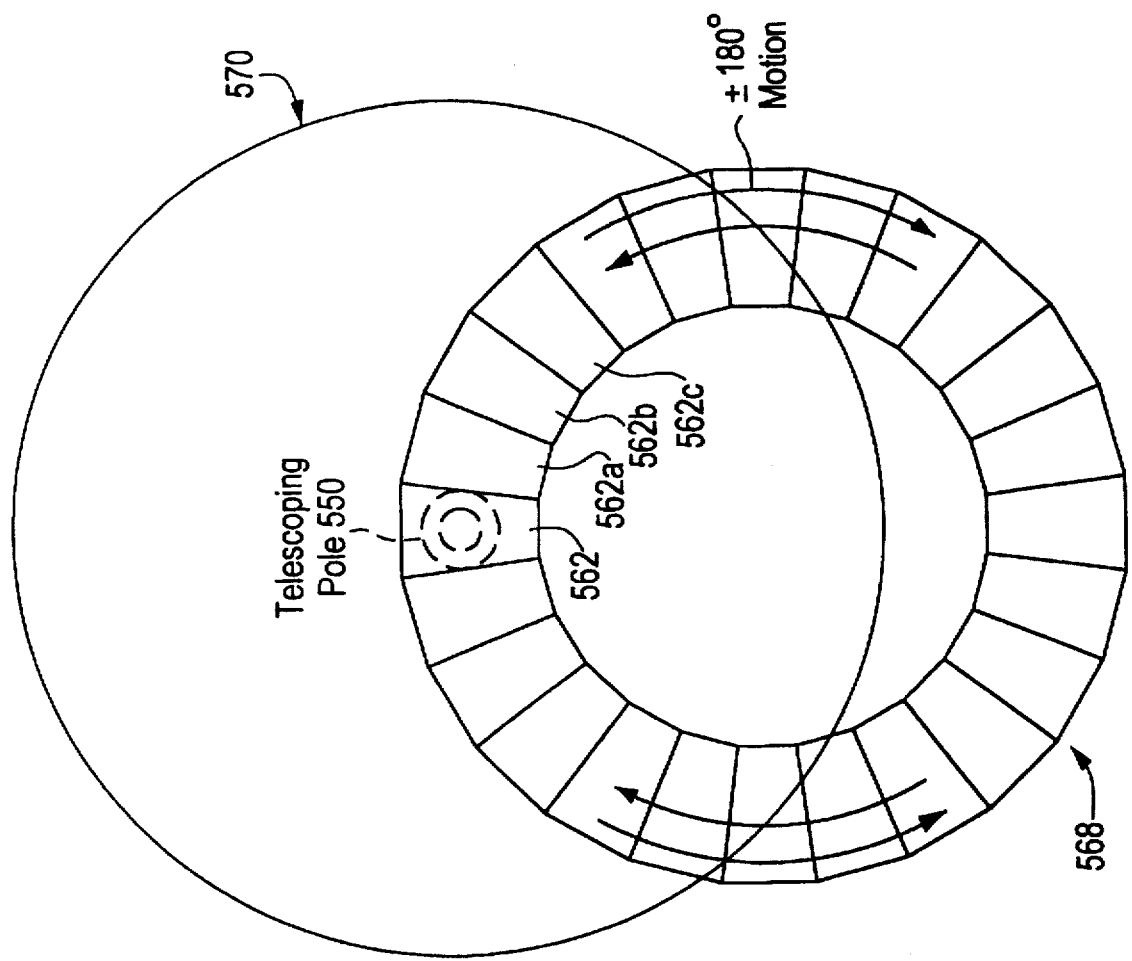
FIG. 15A is a schematic top plan view of a module loading mechanism for the telescopic pole of FIG. 14.

Another approach to launch an inflated balloon uses a pneumatically operated telescopic pole 550, FIG. 14, which is extended to lift radiosonde 562 and balloon 554 clear of the silo. Pole 550 is typically housed in the base of silo 570, FIGS. 15A, B and C, and a pneumatically operated actuator 560 loads a new module 562 onto pole 550 before launch, where it is held by latches 564, 566 and then unloads the used module after the balloon is launched.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A radiosonde balloon launching system comprising:
   a silo for housing a linear array of radiosonde balloon modules containing uninflated radiosonde balloons and for sheltering said radiosonde balloons during inflation;
   base means for containing radiosonde balloon inflation and launch apparatus;
   means for sequentially feeding each of said modules in said linear array to said inflation and launch apparatus; and
   said silo including means for shielding said radiosonde balloons until they are ready to be launched.

2. The system of claim 1 wherein said means for sequentially feeding includes a track for providing said linear array of modules to said inflation and launch apparatus.

3. The system of claim 1 wherein said radiosonde balloon modules each include a radiosonde balloon and a radiosonde.

4. The system of claim 3 wherein each said module includes means for housing one of said radiosonde balloons, said radiosonde being powered by a battery and tethered to said radiosonde balloon, and means for attaching said radiosonde balloon to said inflation and launch apparatus.

5. The system of claim 4 wherein said module further includes means for filling said battery with a battery charging fluid.

6. The system of claim 5 wherein said module further includes means for indicating that said battery is fully charged.

7. The system of claim 6 wherein said means for indicating includes a light source powered by said battery and a photoelectric element which, in response to detecting light from said light source, outputs a signal which indicates that said battery is fully charged.

8. The system of claim 4 wherein said means for attaching includes a balloon release valve which simultaneously stops the flow of gas into said balloon and releases said balloon when engaged.

9. The system of claim 8 wherein said module further includes hatch means having a spring-loaded hinge and a latch; a hatch release mechanism; and a balloon release mechanism which engages said balloon release valve, thereby releasing said balloon.

10. The system of claim 3 wherein said module further includes means for monitoring the rate of inflation of said radiosonde balloons.

11. The system of claim 1 wherein said radiosonde balloon inflation and launch apparatus includes a microprocessor for controlling the inflation and launch of said radiosonde balloons.

12. The system of claim 1 wherein said radiosonde balloon inflation and launch apparatus includes means for storing a lighter-than-air gas.

13. The system of claim 12 wherein said lighter-than-air gas is helium.

14. The system of claim 1 wherein said silo includes means for indicating that said radiosonde balloons are inflated properly.

15. The system of claim 14 wherein said means for indicating includes a light source and a photoelectric element mounted on opposite interior sides of said silo.

16. The system of claim 1 wherein said radiosonde balloon inflation and launch apparatus is coupled to each of said radiosonde balloon modules.

17. The system of claim 1 wherein each said module further includes means for regulating the temperature within said module.

18. The system of claim 17 wherein said module further includes means for introducing a purge gas into said module to prevent said radiosonde balloon from deteriorating.

19. The system of claim 18 wherein said purge gas is nitrogen.

* * * * *